US008853324B2

(12) United States Patent
Topoulos

(10) Patent No.: US 8,853,324 B2
(45) Date of Patent: *Oct. 7, 2014

(54) MOBILE TELEPHONE HOUSING COMPRISING POLYAMIDE RESIN COMPOSITION

(75) Inventor: Georgios Topoulos, Geneva (CH)

(73) Assignee: E I du Pont de Nemours and Company, Wilmington, DE (US)

(*) Notice: Subject to any disclaimer, the term of this patent is extended or adjusted under 35 U.S.C. 154(b) by 735 days.

This patent is subject to a terminal disclaimer.

(21) Appl. No.: 11/985,436

(22) Filed: Nov. 15, 2007

(65) Prior Publication Data

US 2009/0005502 A1  Jan. 1, 2009

Related U.S. Application Data

(60) Provisional application No. 60/860,766, filed on Nov. 22, 2006.

(51) Int. Cl.
| | |
|---|---|
| *C08L 77/04* | (2006.01) |
| *C08K 7/14* | (2006.01) |
| *C08K 7/16* | (2006.01) |
| *C08K 3/04* | (2006.01) |
| *H04M 1/18* | (2006.01) |
| *C08L 77/00* | (2006.01) |
| *C08L 23/16* | (2006.01) |

(52) U.S. Cl.
CPC ............... *H04M 1/185* (2013.01); *C08L 77/00* (2013.01); *C08L 23/16* (2013.01)
USPC ........... 524/606; 524/514; 524/420; 524/612; 523/200; 528/310

(58) Field of Classification Search
CPC ............ C08L 77/04; C08K 7/14; C08K 7/16; C08K 3/04; H04M 1/0202

USPC .......... 264/540; 428/220, 504; 524/147, 404, 524/430, 431, 445, 446, 447, 497, 514, 601, 524/606, 612, 100, 420; 528/310; 523/200

See application file for complete search history.

(56) References Cited

U.S. PATENT DOCUMENTS

| | | | | |
|---|---|---|---|---|
| 3,264,272 A | * | 8/1966 | Rees ............................ | 428/36.9 |
| 4,062,819 A | * | 12/1977 | Mains et al. ............... | 525/420.5 |
| 4,187,358 A | | 2/1980 | Kyo et al. | |
| 5,039,746 A | * | 8/1991 | Neugebauer et al. ......... | 525/152 |
| 5,750,639 A | * | 5/1998 | Hayashi ....................... | 528/310 |
| 2001/0003766 A1 | * | 6/2001 | Nozaki ............................ | 525/66 |
| 2002/0019477 A1 | * | 2/2002 | Bartz et al. .................... | 524/514 |
| 2007/0270544 A1 | | 11/2007 | Buhler | |

FOREIGN PATENT DOCUMENTS

WO  WO2007/149300 A1  12/2007

OTHER PUBLICATIONS

Zytel® 77G43L and 77G33L data sheets (2005) Available at: www2.dupont.com/Plastics/en_US/Products/Zytel/zytel_amer_data_sheets.html.*
RTP Polyamide 612 info page (Jan. 7, 2005) Available at: www.rtpcompany.com/info/data/0200D/index.htm.*
MatWeb, Polyamide 6,12. Online at: http://www.matweb.com/search/DataSheet.aspx?MatGUID=e25096d5ee584fedbd6269aa1914672b.*
Effect of Mixer Resident Time on the Overall Moduli of Polymer Blends—Shimin Xie.
Patent Abstracts of Japan, Publication No. 57168941, Toray Ind., Inc., Heat-Resistant Reinforced Polyamide Molding.

* cited by examiner

*Primary Examiner* — Ling Choi
*Assistant Examiner* — Ronald Grinsted

(57) ABSTRACT

A mobile telephone housing comprising a polyamide composition having excellent stiffness and low moisture absorption.

12 Claims, No Drawings

US 8,853,324 B2

MOBILE TELEPHONE HOUSING COMPRISING POLYAMIDE RESIN COMPOSITION

CROSS REFERENCE TO RELATED APPLICATIONS

This application claims the benefit of priority to U.S. Provisional Application No. 60/860,766, filed Nov. 22, 2006.

FIELD OF THE INVENTION

The present invention relates to a mobile telephone housing comprising a polyamide composition having excellent stiffness and low moisture absorption.

BACKGROUND OF THE INVENTION

Mobile (also referred to as "cellular") telephones are becoming increasingly widely used globally. It is often important that they be made from materials that are able to withstand rigors of frequent use while still not interfering with the operation of the telephone and its ability to send and receive electromagnetic signals. Mobile telephone housings are a particularly demanding materials application. Mobile telephone housings comprise one or more components that can include the back and front covers, the backbone, and the antenna housing, depending on the design of the telephone.

In many cases the backbone is a frame onto which many of the components of the telephone, such as the screen, keypad, battery socket, microprocessors, other electronic components, antennas, etc., are mounted. In addition to providing structural support for the telephone and many of its components, the backbone may provide the primary protection of many of these components against impact. Covers may provide additional protection from impact and protect the backbone and internal components from contamination. Covers may also provide substantial or primary structural support for and protection against impact of certain components, such as screens and/or antennas. It is thus often important that the materials used for mobile telephone housings have high modulus and impact resistances.

Additionally, for optimal functioning of a mobile telephone it is often necessary or desirable that the housing material in the vicinity of the antenna be as transparent as possible to electromagnetic radiation having frequencies in the range of about to 40 MHz to 6 GHz and that the material's response to such electromagnetic radiation not vary significantly as a result of environment conditions such as temperature and relative humidity. Otherwise, the amplitude of the radio signals sent and received by the telephone can be affected, resulting in a lost or weakened connection or requiring increased power consumption to maintain a signal at a desirable level.

Thermoplastic polyamide compositions are desirable for use in making mobile telephone housings because of their good physical properties and that they may be conveniently and flexibly molded into a variety of articles of varying degrees of complexity and intricacy. However, many polyamides absorb significant amounts of moisture when exposed to atmospheric conditions, which may decrease the transparency of the compositions to 40 MHz to 6 GHz electromagnetic radiation. Typically, the greater the level of moisture absorbed by the composition, the less transparent the composition is to 40 MHz to 6 GHz electromagnetic radiation. Polyamide 12, for example, has good resistance to moisture absorption, but is insufficiently stiff for many mobile telephone housing applications.

Thus it would be desirable to obtain to make mobile telephone housings from a polyamide composition having a combination of good mechanical properties and low moisture absorption.

SUMMARY OF THE INVENTION

There is disclosed and claimed herein a mobile telephone housing, comprising a polyamide composition comprising,
(A) about 20 to about 70 weight percent of at least one polyamide component comprising,
 (a) about 60 to about 100 weight percent of at least one aliphatic polyamide comprising,
  (i) about 60 to 100 mole percent of repeat units derived from one or more aliphatic dicarboxylic acids and one or more aliphatic diamines, wherein at least about 50 mole percent of the aliphatic dicarboxylic acids and aliphatic diamines are aliphatic dicarboxylic acids and/or aliphatic diamines that have 10 or more carbon atoms,
  (ii) 0 to about 40 mole percent of repeat units derived from one or more aromatic dicarboxylic acids,
  (iii) 0 to about 40 mole percent of repeat units derived from one or more lactams and/or aminocarboxylic acids, wherein at least about 50 mole percent of the lactams and/or aminocarboxylic acids have 10 or more carbon atoms; and
 (b) 0 to about 40 weight percent of at least one semiaromatic polyamide comprising about 60 to 100 of repeat units derived from one or more aromatic dicarboxylic acids; and
(B) about 30 to about 65 weight percent of one or more reinforcing agents; and
(C) 0 to about 20 weight percent of one or more impact modifiers;
wherein the weight percentages of (a) and (b) are based on the total weight of (a)+(b) and the weight percentages of (A), (B), and (C) are based on the total weight of (A)+(B)+(C), and the composition has a tensile modulus greater than or equal to about 12 GPa, as measured by ISO 527-1/2 and a moisture absorption of less than or equal to about 0.4 weight percent, as measured by ISO 62.

The instant invention provides mobile telephone housings comprising polyamide compositions having excellent stiffness and low moisture absorption.

DETAILED DESCRIPTION OF THE INVENTION

By "mobile telephone housing" (also referred to herein as "housings") is meant one or more of the back cover, front cover, antenna housing, and/or backbone of a mobile phone. The housing may be a single article incorporating one or more of the foregoing. By "backbone" is meant a structural component onto which other components of the mobile telephone, such as electronics, screens, battery sockets, and the like are mounted. The backbone may be an interior component that is not visible or only partially visible from the exterior of the telephone.

The housing comprises a composition comprising a melt-mixed blend of at least one thermoplastic polyamide component (A), at least one reinforcing agent (B), and optionally, at least one impact modifier (C).

Thermoplastic polyamide component (A) comprises about 60 to 100 weight percent of at least one aliphatic polyamide (a) and, optionally, 0 to about 40 weight percent of at least one semiaromatic polyamide (b), wherein the weight percentages are based on the total weight of polyamide component (A).

Polyamide (a) comprises about 60 to 100 mole percent of repeat units derived from one or more aliphatic dicarboxylic acids and one or more aliphatic diamines, wherein at least about 50 mole percent of the combined amount of aliphatic dicarboxylic acids and aliphatic diamines have 10 or more carbon atoms. Polyamide (a) may further optionally comprise 0 to about 40 mole percent of repeat units derived from one or more aromatic dicarboxylic acids and/or 0 to about 40 mole percent of repeat units derived from one or more lactams and/or aminocarboxylic acids, wherein at least about 50 mole percent of the lactams and/or aminocarboxylic acids have 10 or more carbon atoms.

Suitable aliphatic dicarboxylic acids having 10 or more carbon atoms include sebacic acid; dodecanedioic acid, tetradecanedioic acid, pentadecanedioic acid, and the like. Suitable aliphatic dicarboxylic acids having fewer than 10 carbon atoms and other dicarboxylic acids include adipic acid, terephthalic acid (abbreviated as "T" in polyamide designations), and isophthalic acid (abbreviated as "I" in polyamide designations).

Suitable aliphatic diamines having 10 or more carbon atoms include decamethylenediamine, undecamethylenediamine, dodecamethylenediamine, tridecamethylenediamine, tetramethylenediamine, pentamethylenediamine, hexamethylenediamine, and the like. Suitable aliphatic diamines having fewer than 10 carbon atoms include tetramethylenediamine, hexamethylenediamine, octamethylenediamine, nonamethylenediamine, 2-methylpentamethylenediamine, 2-methyloctamethylenediamine, trimethylhexamethylenediamine. Suitable alicyclic diamines include bis(p-aminocyclohexyl)methane.

Suitable lactams and/or aminocarboxylic acids having 10 or more carbon atoms include 11-aminoundecanoic acid and laurolactam. Suitable lactams and/or aminocarboxylic acids having fewer than 10 carbon atoms include caprolactam.

Examples of polyamides suitable for use as polyamide (a) include, but are not limited to polyamide 9,10; polyamide 9,12; polyamide 9,13; polyamide 9,14; polyamide 9,15; polyamide 6,16; polyamide 9,36; polyamide 10,10; polyamide 10,12; polyamide 10,13; polyamide 10,14; polyamide 12,10; polyamide 12,12; polyamide 12,13; polyamide 12,14; polyamide 6,14; polyamide 6,13; polyamide 6,15; polyamide 6,16; polyamide 6,13; copolymers or two or more thereof; and blends thereof. Preferred blends include blends of polyamide 6,10 and polyamide 6,12 and blends of polyamide 6,14 and polyamide 6,12.

The aliphatic polyamide can preferably be melt-processed at temperatures of about 250° C. or less. They preferably have a melting point of about 230° C. or less or more preferably of about 220° C. or less.

Semiaromatic polyamide, (b) comprises about 60 to 100 of repeat units derived from one or more aromatic dicarboxylic acids. Preferred aromatic dicarboxylic acids include terephthalic acid and isophthalic acid. Aliphatic diamines (including those mentioned as suitable for use in preparing aliphatic polyamide (a)) may be used to prepare semiaromatic polyamide (b). Semiaromatic polyamide (b) may optionally comprise repeat units derived from aliphatic dicarboxylic acids. Preferred semiaromatic polyamides include hexamethylene isophthalamide/hexamethylene terephthalamide copolymers (polyamide 6, I/6,T). The semiaromatic polyamides may be amorphous.

Reinforcing agent (B) is present in the composition about 30 to about 60 weight percent, or preferably in about 45 to about 55 weight percent, based on the total weight of components (A)+(B)+(C). Suitable reinforcing agents include one or more of glass fibers, long glass fibers, glass flakes, carbon fibers (including carbon nanotubes), wollastonite, talc, kaolin, calcium carbonate, and the like.

Impact modifier (C) is present in the composition in 0 to about 20 weight percent, or more preferably in 0 to about 15 weight percent, or yet more preferably in about 5 to about 15 weight percent, or still more preferably in about 5 to 10 weight percent, based on the total weight of components (A)+(B)+(C).

Preferred impact modifiers include those typically used for polyamides, including carboxyl-substituted polyolefins, which are polyolefins that have carboxylic moieties attached thereto, either on the polyolefin backbone itself or on side chains. By "carboxylic moieties" is meant carboxylic groups such as one or more of dicarboxylic acids, diesters, dicarboxylic monoesters, acid anhydrides, and monocarboxylic acids and esters. Useful impact modifiers include dicarboxyl-substituted polyolefins, which are polyolefins that have dicarboxylic moieties attached thereto, either on the polyolefin backbone itself or on side chains. By 'dicarboxylic moiety' is meant dicarboxylic groups such as one or more of dicarboxylic acids, diesters, dicarboxylic monoesters, and acid anhydrides.

The impact modifier may preferably be based on an ethylene/α-olefin polyolefin. Diene monomers such as 1,4-hexadiene or dicyclopentadiene may optionally be used in the preparation of the polyolefin. Preferred polyolefins are ethylene-propylene-diene (EPDM) polymers made from 1,4-hexadiene and/or dicyclopentadiene. The carboxyl moiety may be introduced during the preparation of the polyolefin by copolymerizing with an unsaturated carboxyl-containing monomer. Preferred is a copolymer of ethylene and maleic anhydride monoethyl ester. The carboxyl moiety may also be introduced by grafting the polyolefin with an unsaturated compound containing a carboxyl moiety, such as an acid, ester, diacid, diester, acid ester, or anhydride. A preferred grafting agent is maleic anhydride. A preferred impact modifier is an EPDM polymer grafted with maleic anhydride, such as Fusabond® N MF521 D, which is commercially available from E. I. DuPont de Nemours & Co., Inc., Wilmington, Del. Blends of polyolefins, such as polyethylene, polypropylene, and EPDM polymers with polyolefins that have been grafted with an unsaturated compound containing a carboxyl moiety may be used as an impact modifier.

Suitable impact modifiers may also include ionomers. By an ionomer is meant a carboxyl group containing polymer that has been neutralized or partially neutralized with metal-cations such as zinc, sodium, or lithium and the like. Examples of ionomers are described in U.S. Pat. Nos. 3,264,272 and 4,187,358, both incorporated by reference herein. Examples of suitable carboxyl group containing polymers include, but are not limited to, ethylene/acrylic acid copolymers and ethylene/methacrylic acid copolymers. The carboxyl group containing polymers may also be derived from one or more additional monomers, such as, but not limited to, butyl acrylate. Zinc salts are preferred neutralizing agents. Ionomers are commercially available under the Surlyn® trademark from E.I. du Pont de Nemours and Co., Wilmington, Del.

The compositions used in the present invention may optionally comprise additional additives such as ultraviolet light stabilizers, heat stabilizers, antioxidants, processing aids, lubricants, flame retardants, and/or colorants (including dyes, pigments, carbon black, and the like).

The compositions used in the present invention have a tensile modulus that is at least about 12 GPa, or preferably at least 13 GPa, or more preferably at least 14 GPa. Tensile modulus is determined according to the ISO 527-1/2 method.

Test specimens are elongated at a constant rate of 1 mm/min. The tensile modulus E is determined using Young's law by measuring the forces F1 and F2 needed to elongate test specimens to 0.05 percent (e1) and 0.25 percent (e2):

$$E=(F2-F1)/(S*(e2-e1))$$

where S is the cross section (transversal section) of the test specimen.

The test specimens used are tensile type 1B with a radius r of 60 mm, which are described into the ISO procedure and obtained by injection molding. Test specimens are placed into sealed bags immediately after molding until testing in order to prevent moisture pick up. Tensile modulus is measured for 8 specimens for each polymer and the results is the average of them. Cross section S is determined for each sample by measuring its thickness and its breadth.

The compositions used in the present invention have a moisture absorption of no greater than about 0.4 weight percent, or preferably no greater than about 0.3 weight percent, or more preferably no greater than about 0.25 weight percent. Moisture absorption is measured using the ISO 62 method.

Moisture absorption is determined on injection-molded test specimens in the form of plates having dimensions of 60×60×2 mm. The test specimens are placed in sealed bags immediately after molding for storage prior to testing. During testing, the test specimens are immersed in distilled water at 23° C. The amount of water absorbed by the test specimen is determined by measuring its change in mass, i.e. the difference between the initial mass and that after exposure to water, and is expressed as a percentage of the initial mass. The moisture absorption is the average of the results from five test specimens The compositions used in the present invention are made by melt-blending the components using any known methods. The component materials may be mixed to uniformity using a melt-mixer such as a single or twin-screw extruder, blender, kneader, Banbury mixer, etc. to give a resin composition. Or, part of the materials may be mixed in a melt-mixer, and the rest of the materials may then be added and further melt-mixed until uniform.

The mobile telephone housing is made from the compositions using any suitable melt-processing method. Injection molding is a preferred method.

EXAMPLES

The compositions of Examples 1-7 were prepared by melt-compounding the ingredients shown in Table 1 in a twin-screw extruder. The resulting compositions were injection molded into test specimens. In Table 1, "impact modifier" refers to ethylene/propylene/diene copolymers partially grafted with maleic anhydride and "color masterbatch" refers to 40 weight percent of a blue pigment in polyamide 6. The lubricant is a fatty acid salt.

The material used in Comparative Example 1 is Zytel® HTN 53G50 LRH NC, a polyamide 6, I/6,T-polyamide 6,6 blend supplied by E.I. du Pont de Nemours & Co., Wilmington, Del., which was injection molded into test specimens.

Tensile modulus was determined using ISO 527-1/2 as described above. Impact strengths were determined using ISO 179eA. Moisture absorption was determined using ISO 62 as described above. The results are shown in Table 2.

TABLE 1

|  | Ex. 1 | Ex. 2 | Ex. 3 | Ex. 4 | Ex. 5 | Ex. 6 | Ex. 7 |
|---|---|---|---|---|---|---|---|
| Polyamide 10,10 | 45.9 | 36.9 | 30.9 | 30.9 | 30.9 | 41.3 | 36.3 |
| Polyamide 6,14 | — | — | 10 | — | — | — | — |
| Polyamide 6,12 | — | — | — | 15 | 10 | — | — |
| Polyamide 6,I/6,T | — | 9 | — | — | — | — | — |
| Glass fibers | 50 | 50 | 55 | 50 | 55 | 55 | 55 |
| Impact modifier | — | — | — | — | — | — | 5 |
| Antioxidants | 0.9 | 0.9 | 0.9 | 0.9 | 0.9 | 0.4 | 0.4 |
| Lubricant | 0.2 | 0.2 | 0.2 | 0.2 | 0.2 | 0.3 | 0.3 |
| Color masterbatch | 3 | 3 | 3 | 3 | 3 | 3 | 3 |

Ingredient amounts are given in weight percents based on the total weight of the composition.

TABLE 2

|  | Ex. 1 | Ex. 2 | Ex. 3 | Ex. 4 | Ex. 5 | Ex. 6 | Ex. 7 | Comp. Ex. 1 |
|---|---|---|---|---|---|---|---|---|
| Tensile modulus (GPa) | 14 | 13.1 | 16 | 14.7 | 16.6 | 17.2 | 15.9 | 17 |
| Elongation at break (%) | 2.4 | 2.1 | 2.9 | 3.5 | 3.2 | 2.7 | 2.9 | 2.7 |
| Notched Charpy impact strength (kJ/m$^2$) | 10.5 | 8 | 10.7 | 13.3 | 12.4 | 12.3 | 13.1 | 12.9 |
| Unnotched Charpy impact strength (kJ/m$^2$) | 64.4 | 53.9 | 72.2 | 77.7 | 76.2 | 77.9 | 66.9 | 96.8 |
| Moisture absorption (%) | 0.17 | 0.19 | 0.15 | 0.18 | 0.16 | 0.15 | — | 0.57 |

The compositions of Examples 1-7 are molded into mobile telephone housings that exhibit good impact resistance and stiffness and good transmission of electromagnetic radiation having frequencies in the range of 40 MHz to 6 GHz.

What is claimed is:

1. A mobile telephone housing, comprising a polyamide composition comprising,
 (A) about 20 to about 70 weight percent of at least one polyamide component comprising,
  (a) about 60 to about 100 weight percent of at least one aliphatic polyamide selected from the group consisting of polyamide 10,10 and polyamide 10,12
  (iii)
  (b) 0 to about 40 weight percent of at least one semiaromatic polyamide comprising about 60 to 100 mole percent of repeat units derived from one or more aromatic dicarboxylic acids; and
 (B) about 30 to about 65 weight percent of one or more reinforcing agents; and
 (C) 0 to about 20 weight percent of one or more impact modifiers;
wherein the weight percentages of (a) and (b) are based on the total weight of (a)+(b) and the weight percentages of (A), (B), and (C) are based on the total weight of (A) (B) (C), and the composition has a tensile modulus greater than or equal to about 12 GPa, as measured by ISO 527-1/2 and a moisture absorption of less than or equal to about 0.25 weight percent, as measured by ISO 62.

2. The housing of claim 1, wherein the aliphatic polyamide (a) has a melting point of about 230° C. or less.

3. The housing of claim 1, wherein the semiaromatic polyamide (b) is hexamethylene isophthalamide/hexamethylene terephthalamide copolymer.

4. The housing of claim 1, wherein the reinforcing agent comprises glass fibers.

5. The housing of claim 1, wherein the reinforcing agent comprises glass fibers and carbon fibers.

6. The housing of claim 1, wherein the composition has a tensile modulus greater than or equal to about 13 GPa.

7. The housing of claim 6, wherein the composition has a tensile modulus greater than or equal to about 14 GPa.

8. The housing of claim 1, wherein the impact modifier is present in about 5 to about 15 weight percent.

9. The housing of claim 1, wherein the impact modifier is one or more carboxyl-substituted polyolefins.

10. The housing of claim 1, wherein the impact modifier is one or more carboxyl-substituted ethylene-propylene-diene polymers.

11. The housing of claim 1, wherein the impact modifier is one or more ionomers.

12. The housing of claim 1, wherein the composition further comprises one or more ultraviolet light stabilizers, heat stabilizers, antioxidants, processing aids, lubricants, flame retardants, and/or colorants.

\* \* \* \* \*